(12) United States Patent
Wentink

(10) Patent No.: US 8,923,285 B2
(45) Date of Patent: Dec. 30, 2014

(54) APPARATUS AND METHODS FOR TRANSMITTING DATA OVER A WIRELESS MESH NETWORK

(75) Inventor: Maarten Menzo Wentink, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 12/432,603

(22) Filed: Apr. 29, 2009

(65) Prior Publication Data

US 2009/0274173 A1  Nov. 5, 2009

Related U.S. Application Data

(60) Provisional application No. 61/049,319, filed on Apr. 30, 2008.

(51) Int. Cl.
*H04L 12/28* (2006.01)
*H04W 28/06* (2009.01)
*H04L 29/06* (2006.01)

(52) U.S. Cl.
CPC ............ *H04W 28/06* (2013.01); *H04L 69/22* (2013.01)
USPC .......................................... 370/389; 370/392

(58) Field of Classification Search
None
See application file for complete search history.

(56) References Cited

U.S. PATENT DOCUMENTS

| | | | |
|---|---|---|---|
| 2003/0067912 A1* | 4/2003 | Mead et al. | 370/389 |
| 2004/0228413 A1 | 11/2004 | Hannuksela | |
| 2006/0083298 A1* | 4/2006 | Wang et al. | 375/240.01 |
| 2008/0049621 A1 | 2/2008 | McGuire et al. | |
| 2008/0092204 A1* | 4/2008 | Bryce et al. | 725/143 |
| 2008/0095045 A1* | 4/2008 | Owens et al. | 370/220 |
| 2008/0151891 A1 | 6/2008 | Juszkiewicz et al. | |
| 2009/0003291 A1* | 1/2009 | Chu et al. | 370/338 |

FOREIGN PATENT DOCUMENTS

| | | |
|---|---|---|
| JP | 7235949 A | 9/1995 |
| JP | 2011503997 A | 1/2011 |
| RU | 2281617 C2 | 8/2006 |
| RU | 2313912 C2 | 12/2007 |
| WO | 03049405 A1 | 6/2003 |
| WO | 2005004500 A2 | 1/2005 |

OTHER PUBLICATIONS

Rosen et al., Request for Comments: 3032, Jan. 2001, pp. 1-20.*
"Draft Standard for Information Technology—Telecommunications and information exchange between systems—Local and metropolitan area networks—Specific requirements—Part 11: Wireless LAN Medium Access Control (MAC) and Physical Layer (PHY) specifications" 20080301, No. P802.11S /D2.0, Mar. 1, 2008, page Complete, XP007909799 sections 7.1.2, 7.1.3.5b.
Guido R Hiertz et al: "Principles of IEEE 802.115" Computer Communications and Networks, 2007. ICCCN 2007. Proceedings of 16th International Conference on, IEEE, PI, Aug. 1, 2007, pp. 1002-1007, XP031136994 ISBN: 978-1-4244-1250-1 section II.A.

(Continued)

*Primary Examiner* — Nicholas Sloms
(74) *Attorney, Agent, or Firm* — Kevin T. Cheatham

(57) ABSTRACT

Methods and apparatus for transmitting data over a wireless mesh network include generating a first mesh header having a plurality of fields, and extending the first mesh header by prepending a protocol header to generate a second mesh header. The second mesh header may be inserted into a protocol data unit for transmitting the protocol data unit via the mesh network.

38 Claims, 8 Drawing Sheets

(56) References Cited

OTHER PUBLICATIONS

International Search Report and Written Opinion—PCT/US2009/042278, International Search Authority—European Patent Office—Sep. 24, 2009.
Michael Bahr Ed—Reza Shokri et al: "Update on the Hybrid Wireless Mesh Protocol of IEEE 802.11s" Mobile Adhoc and Sensor Systems, 2007. Mass 2007. IEEE International Co Nference On, IEEE, PI, Oct. 1, 2007, pp. 1-6, XP031200980 ISBN 978-1-4244-1454-3 section 3.1.

"Odd Mesh Header (doc. IEEE 802.11-08/0341r3)" Internet Citation, [Online] Mar. 17, 2008, XP007909809 Retrieved from the Internet: URL:https://mentor.ieee.org/802.1l/dcn/08/ll-08-0341-03-000s-odd-mesh-header.ppt> [retrieved on Sep. 2009]
Carrano, R.C., et al., "Chapter 19 Multihop MAC: IEEE 802.11s Wireless Mesh Networks", Internet Citation, [Online] Apr. 8, 2008, pp. 1-33.
Taiwan Search Report—TW098114415—TIPO—Mar. 22, 2013.
Journal "First mile", RIZ Technosphera, Feb.-Mar. 2008, p. 27.

\* cited by examiner

APPARATUS AND METHODS FOR TRANSMITTING DATA OVER A WIRELESS MESH NETWORK

CLAIM OF PRIORITY UNDER 35 U.S.C. §119

The present application for patent claims priority to Provisional Application No. 61/049,319 entitled "Methods and Apparatuses for Including Mesh Header and Mesh Payload in Medium Access Control (MAC) Protocol Data Unit" filed Apr. 30, 2008, and assigned to the assignee hereof and hereby expressly incorporated by reference herein.

BACKGROUND

1. Field

This application relates generally to mesh networks, and more particularly to transmitting data over a wireless mesh network.

2. Background

A wireless mesh network may be defined as two or more nodes that are interconnected via wireless links which communicate via mesh services. Mesh networking enables data, voice, and instructions to be routed between nodes, allowing for continuous connections and reconfigurations around broken or blocked paths by "hopping" from node to node until the destination is reached. A mesh network whose nodes are all connected to each other is considered a fully connected mesh network.

Mesh networks differ from other networks in that the component parts may connect to each other via multiple hops. Mesh networks are one type of ad hoc network. Moreover, mesh networks are self-healing. More particularly, the mesh network can continue to operate even when a node breaks down or a connection goes bad. As a result, mesh networks can be very reliable.

In mesh networking, each node, or mesh point, has a medium access control (MAC) address. The MAC address is unique to each device. A typical MAC protocol data unit (MPDU) that traverses between multiple wireless nodes includes four address fields. These fields typically represent the receiver address, transmitter address, source address, and destination address. Four address fields is the maximum number of address fields that can be included in the current 802.11 MAC header.

When transmitting external data through a mesh network, more than four address fields may be needed to route a packet, because the external source and destination addresses need to be included also. It would be desirable to have method of including additional address fields in protocol data unit carrying data through a mesh network. It would also be desirable to have a method of signaling the presence of these additional address fields, or other mesh-specific information, such as a mesh-specific sequence number.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description presented later.

According to some aspects, a method for transmitting data over a wireless mesh network comprises generating a first mesh header, the first mesh header including a plurality of fields; extending the first mesh header by prepending a second protocol header to generate a second mesh header, the second protocol header having a same format as a first protocol header of a protocol data unit (PDU); and inserting the second mesh header into the PDU before the first protocol header.

According to some aspects, an apparatus operable in a wireless communication system comprises a processor configured to generate a first mesh header including a plurality of fields, extend the first mesh header by prepending a second protocol header having a same format as a first protocol header in a PDU to generate a second mesh header, and insert the second mesh header into the PDU before the first protocol header; and a memory coupled to the processor for storing data.

According to some aspects, a machine-readable medium has instructions which, when executed by a machine, cause the machine to perform operations including generating a first mesh header, the first mesh header including a plurality of fields; extending the first mesh header by prepending a second protocol header to generate a second mesh header, the second protocol header having a same format as a first protocol header of a protocol data unit; and inserting the second mesh header into the PDU before the first protocol header.

According to some aspects, an apparatus operable in a wireless mesh network comprises means for generating a first mesh header, the first mesh header including a plurality of fields; means for extending the first mesh header by prepending a second protocol header to generate a second mesh header, the second protocol header having a same format as a first protocol header of a protocol data unit; and means for inserting the second mesh header into the PDU before the first protocol header.

According to some aspects, at least one processor configured to include a mesh header in a medium access control (MAC) protocol data unit (MPDU) in a wireless communication system comprises a first module for generating a first mesh header, the first mesh header including a plurality of fields; a second module for extending the first mesh header by prepending a second protocol header to generate a second mesh header, the second protocol header having a same format as a first protocol header of a protocol data unit; and a third module for inserting the second mesh header into the PDU before the first protocol header.

DETAILED DESCRIPTION

Figure 1:
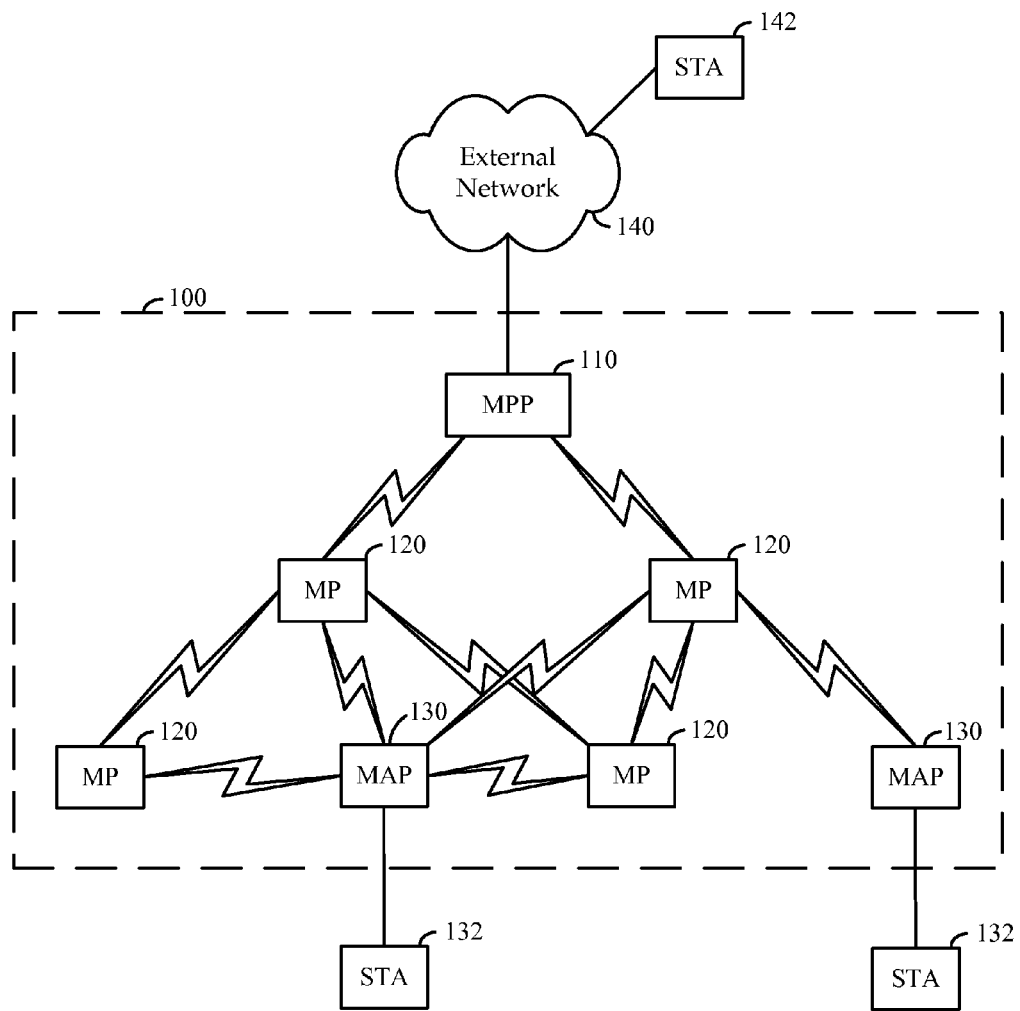
FIG. 1 depicts a wireless mesh network, in accordance with some aspects.

FIG. 1 depicts an exemplary network environment in which various aspects may be implemented. As depicted in FIG. 1, a wireless mesh network 100 includes a mesh portal (MPP) 110, a plurality of mesh points (MP) 120, and a plurality of mesh access points (MAP) 130. An MPP is a mesh point having a connection to a wired source, such as the Internet, and serves as an entry/exit point for MAC service data units (MSDUs) entering or exiting the mesh network. As depicted in FIG. 1, MPP 110 is connected to external network 140. External network 140 may have one or more stations (STA) 142 connected thereto. While a wired link is depicted between external network 140 and station 142, a wireless link may also be provided.

MPs 120 form mesh links with one another, over which mesh paths may be established using a routing protocol. Examples of mesh routing protocols include, for example, Hybrid Wireless Mesh Protocol (HWMP), Ad-hoc On-demand Distance Vector Protocol (AODV), Optimized Link State Routing (OLSR), and/or other routing protocols. A mesh link may be shared by two nodes which may directly communicate with each other via a wireless medium. MAPs 130 are mesh nodes which also serve as access points. MAP 130 provides mesh service to stations 132, which are not members of the mesh network. An MPP 110 and an MAP 130 may be collocated on the same device. MPs not yet members of a mesh may first perform neighbor discovery to connect to the network. For example, a node may scan neighboring nodes for beacons which contain a matching profile, the profile comprising a mesh ID, path selection protocol identifier, a link metric identifier, etc.

Figure 2:
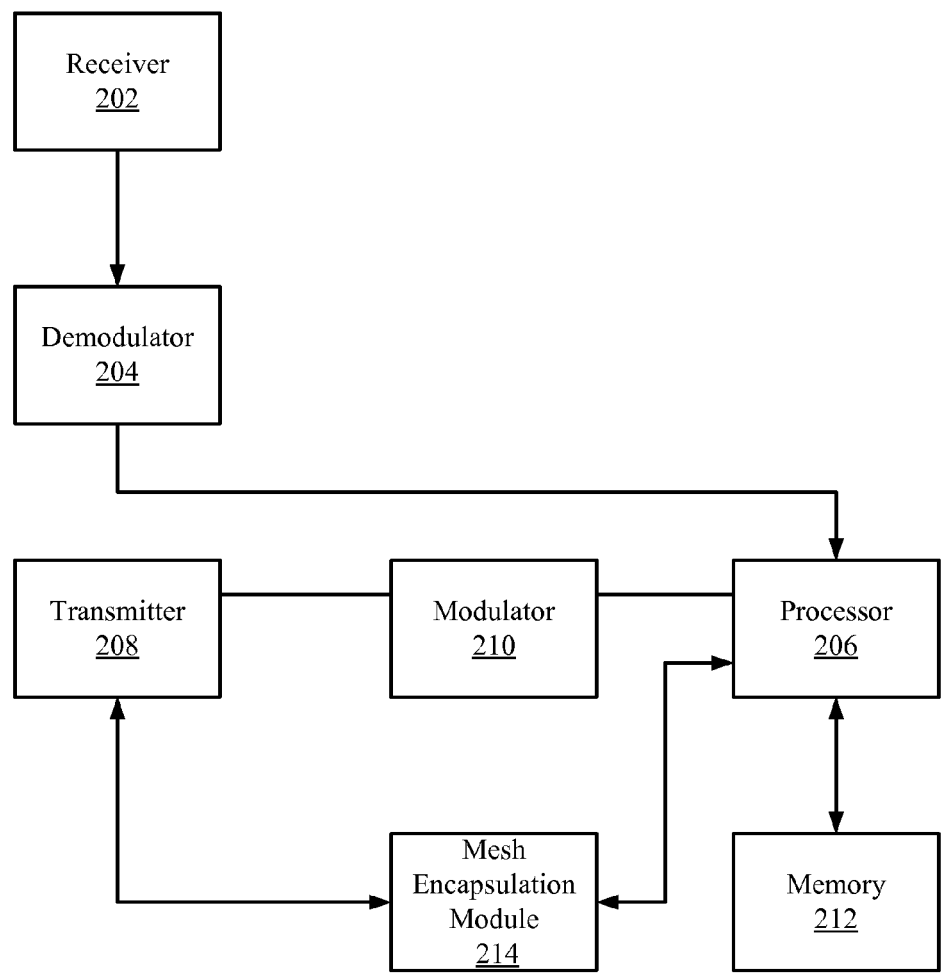
FIG. 2 depicts a wireless device implementing various disclosed aspects.

FIG. 2 depicts a wireless device 200 which may serve as an MP in a mesh network. Device 200 may comprise a receiver 202, demodulator 204, processor 206, transmitter 208, modulator 210, and memory 212. Receiver 202 may receive a signal and perform typical actions thereon, such as filtering, amplifying, downconverting, etc. Receiver 202 may provide digitized samples to demodulator 204 which demodulates the received signals and provides them to processor 206 for channel estimation. Processor 206 may be configured to analyze information received by receiver 202 and generate information for transmission by transmitter 708. Processor 206 may be further configured to control one or more components of device 200. Memory 212 may store information needed by other components of device 200.

Device 200 may further comprise a mesh encapsulation module 214, which enables mesh headers to be extended and inserted into another protocol data unit for transmission through a mesh network. For example, the mesh headers may be inserted into an 802.11 wireless frame. Other protocols into which a mesh header may be inserted include, but are not limited to: an application layer protocol, a presentation layer protocol, a session layer protocol, a transport layer protocol, a network layer protocol, a data link layer protocol, or a physical layer protocol. While many aspects are described herein using 802.11 communications, these descriptions are merely exemplary. Any other protocol and its associated protocol data unit may be used. Adding mesh headers may include inserting additional addresses into a data frame. Additionally, indicia may be inserted into the frame to indicate that the mesh header is present in the frame. Indicia may include, for example, an ethertype value associated with the mesh data, a bit in the header of the PDU, and/or other indicia.

As data is transmitted, various headers and/or other fields may be included at various technology layers, depending upon the communications protocol in use. For example, an 802.11 wireless protocol stack comprises a physical layer, a data link layer, and a network layer. The data link layer may be subdivided into a MAC sub-layer and an LLC sub-layer. The 802.11 MAC header is followed by an LLC header, according to convention.

Figure 3A:
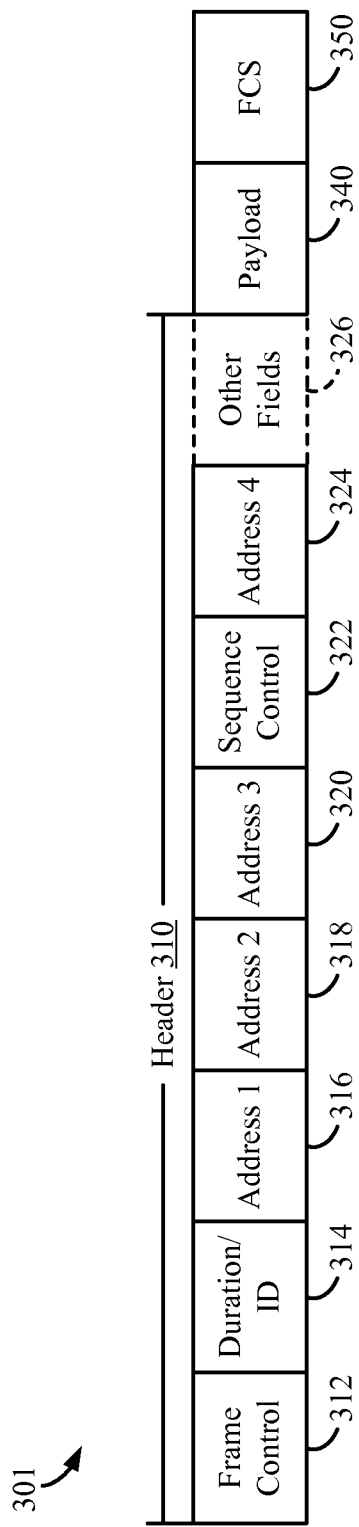
FIG. 3A depicts a typical MAC frame.

FIG. 3A depicts a conventional 802.11 MAC frame or PDU 301, also referred to as an MPDU. The frame 301 comprises header 310, payload 340, and frame check sequence (FCS) 350. The frame header includes a plurality of fields, including a frame control field 312, duration/ID field 314, a first address field 316, a second address field 318, a third address field 320, a sequence control field 322, and a fourth address field 324. First address field 316 identifies the receiver address and second address field 318 identifies the transmitter address. The third address field 320 refers to the destination address for transmission from a non-mesh station to its associated AP, and represents the source address for transmission from an AP to an associated station or to another AP. The fourth address field 320 is typically present only when data is transmitted between two APs, and represents the destination address. Other fields 326 may be present in the MAC header 310, for example, fields related to providing quality of service or encryption.

Figure 3B:
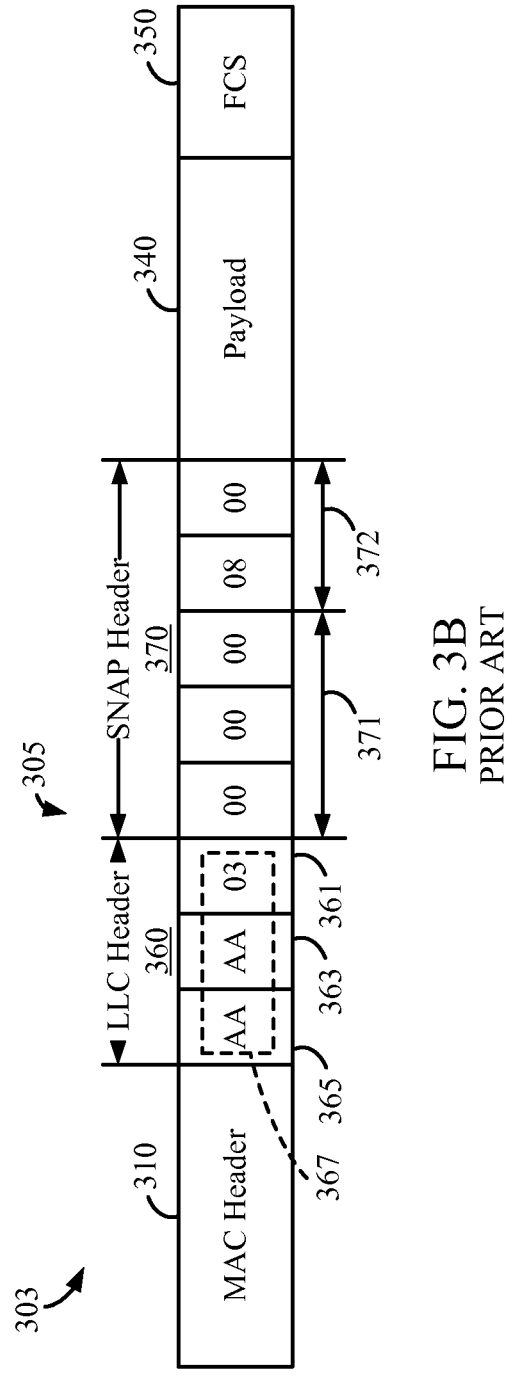
FIG. 3B depicts a typical MAC frame having an LLC/SNAP frame added therein.

The LLC sub-layer allows various network protocols to be transmitted over the same network media, like SubNetwork Address Protocol (SNAP). SNAP may be used to encapsulate Ethernet II frames into an 802.11 data frame. FIG. 3B depicts an 802.11 MAC frame 303 having an LLC/SNAP frame 305 added therein. The LLC/SNAP header is sometimes referred to as a single header. The MAC header 310 is followed by an LLC header 360 and a SNAP header 370. The LLC header 360 comprises three fields, which are referred to as Destination Service Access Point (DSAP) 361, Source Service Access Point (SSAP) 363 and Control 365. The DSAP-SSAP-Control fields are set to a value 367, such as "AA-AA-03," to indicate the presence of a following protocol header, such as SNAP header 370. SNAP header 370 includes a plurality of fields, including an Organizationally Unique Identifier (OUI) field 371 and a Protocol Identifier (PID) field 372. In the illustrated aspect, the OUI field 371 is set to have a value of "00-00-00" to indicate that the PID field 372 is interpreted as an ethertype field. A value of the ethertype indicates a type of protocol encapsulated in the frame data. For example, an ethertype value of "08-00" indicates that an Internet Protocol (IP) packet is included. However, a different value may be used to signal the presence of a mesh header.

According to exemplary aspects, indicia may be provided to signal the presence of a mesh header in a protocol data unit. According to some aspects, the indicia may include a bit set in the MAC (or other protocol) header. In other aspects, a customized ethertype may be created to signal or indicate the presence of a mesh header. In yet other aspects, a customized ethertype may be created to signal the presence of a protocol field, wherein the protocol field may be created to signal or indicate the presence of a mesh header. In yet other aspects, a customized DSAP/SSAP combination may be created to signal or indicate the presence of a mesh header. Other indicia may also be provided.

Figure 4:
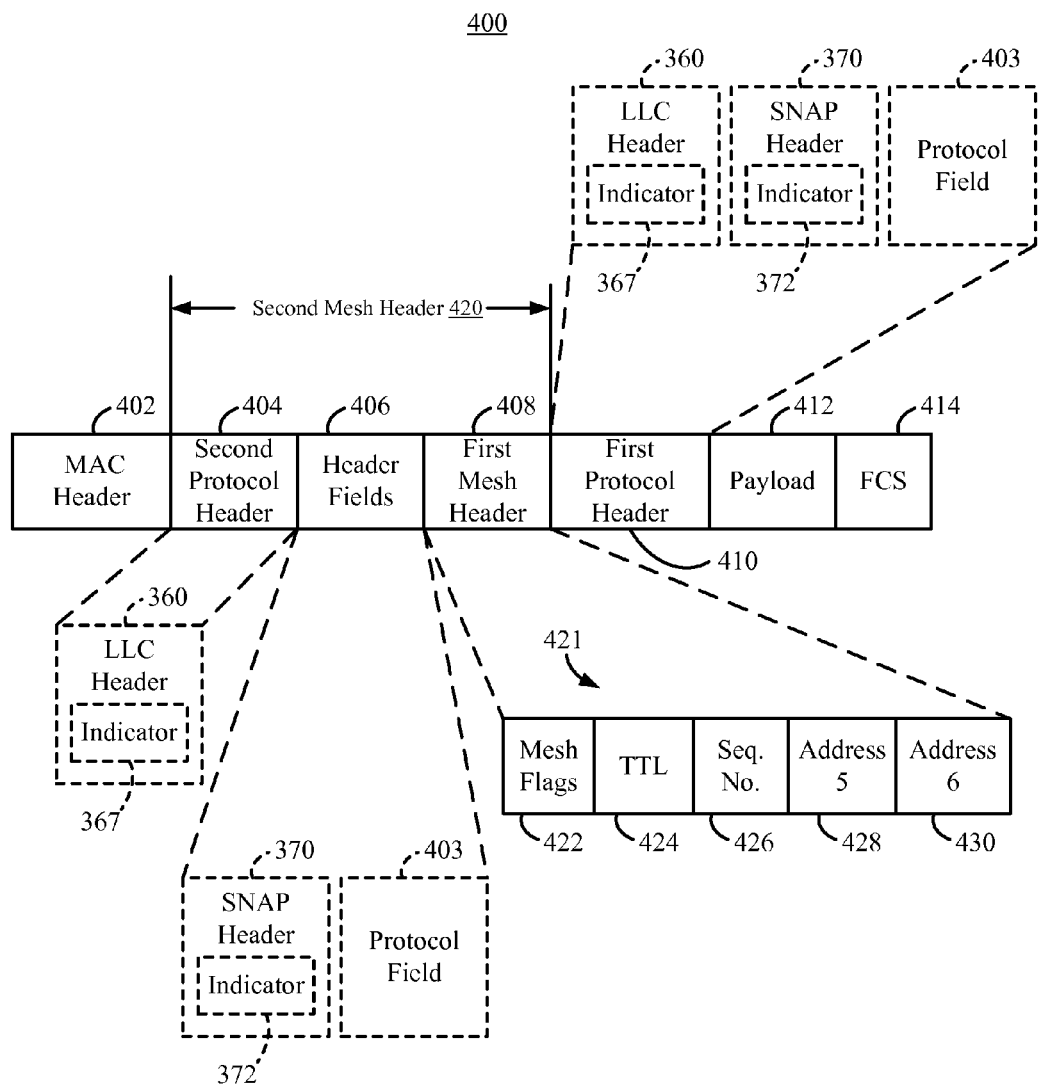
FIG. 4 depicts a mesh header added in a MAC frame, in accordance with some aspects.

FIG. 4 depicts an exemplary PDU 400 with a mesh header added therein. PDU 400 may include MAC header 402, second protocol header 404, header fields 406, first mesh header 408, first protocol header 410, payload 412, and FCS 414. First mesh header 408 combined with second protocol header 404 and/or header fields 406 may form a second mesh header

420. According to some aspects, first protocol header 410 may be an LLC header 360. A SNAP header 370 may also be included as part of the first protocol header 410.

Second protocol header 404 may indicate the presence of the first mesh header 408. According to some aspects, the second protocol header 404 may have the same format as the first protocol header 410. Thus, the second protocol header 404 may be, for example, an LLC header 360. According to some aspects, header fields 406 may be used to indicate the presence of the first mesh header 408. For example, header fields 406 may include a SNAP header 370 having a PID 372, such as a predefined ethertype, that indicates the first mesh header 408 is present, and/or other protocol fields 403, which also may indicate the presence of the first mesh header 408 based on a value or other indicator present in the other protocol fields 403.

In some aspects, the presence of a mesh header may be indicated through the DSAP-SSAP-Control fields 361, 363 and 365 of the LLC header 360, in which case the mesh header follows after the LLC header without SNAP header. In other aspects, the presence of the mesh header may be indicated through the PID field 372 of a company specific OUI. A company specific OUI is an OUI that is not equal to the value "00-00-00." In yet other aspects, the presence of the mesh header may be indicated through a protocol field 403, the presence of which is indicated through a given value, such as a pre-defined ethertype, which is included in LLC/SNAP header 410, such as in the PID field 372.

First mesh header 408 may include a plurality of fields 421, including one or more of a mesh flags field 422, a TTL field 424, a sequence number field 426, a fifth address field 428, and a sixth address field 430. By including one or more of the additional address fields 421, the use of a mesh network as a transport network is accommodated. When the mesh header is present, the first address field 316 indicates the immediate receiver address, the second address field 318 indicates the immediate transmitter address, the third address field 320 indicates the mesh destination address, the fourth address field 324 indicates the mesh source address, the fifth address field 428 indicates the ultimate destination address (outside the mesh network), and the sixth field 430 indicates the ultimate source address (also outside of the mesh network). The mesh source and mesh destination represent the entry and exit points, respectively, for the mesh network. A mesh header may be included for other purposes also.

According to some aspects, a mesh header may be extended by prepending an LLC/SNAP header 305 to the mesh header. In accordance with these aspects, mesh frames may be transmitted through a mesh network by inserting the extended mesh header into a data frame, such as an MPDU, between the MPDU, e.g. MAC, header and the original LLC header. According to other aspects, a mesh header may be extended by prepending a protocol field 403 and an LLC/SNAP header 305 to the mesh header.

In accordance with these aspects, mesh frames may be transmitted through a mesh network by inserting the extended mesh header into a data frame, such as an MPDU, between the MPDU, e.g. MAC, header and the original LLC header.

As described above, the methods described herein are not limited to MAC frames. According to some aspects, an extended mesh header may be added to any type of PDU. The PDU may have associated with it a first protocol header. The first protocol header may signal the presence of a next protocol header following the first protocol header. For example, the first protocol header may be an LLC header. The mesh header may be extended by prepending a second protocol header to the mesh header. The second protocol header may use the same formatting as the first protocol header, and may be used to signal the presence of the mesh header in a data frame. For example, the second protocol header may be an LLC header. The extended mesh header may be inserted into a PDU between the PDU header and the first protocol header prior to transmission.

Figure 5:
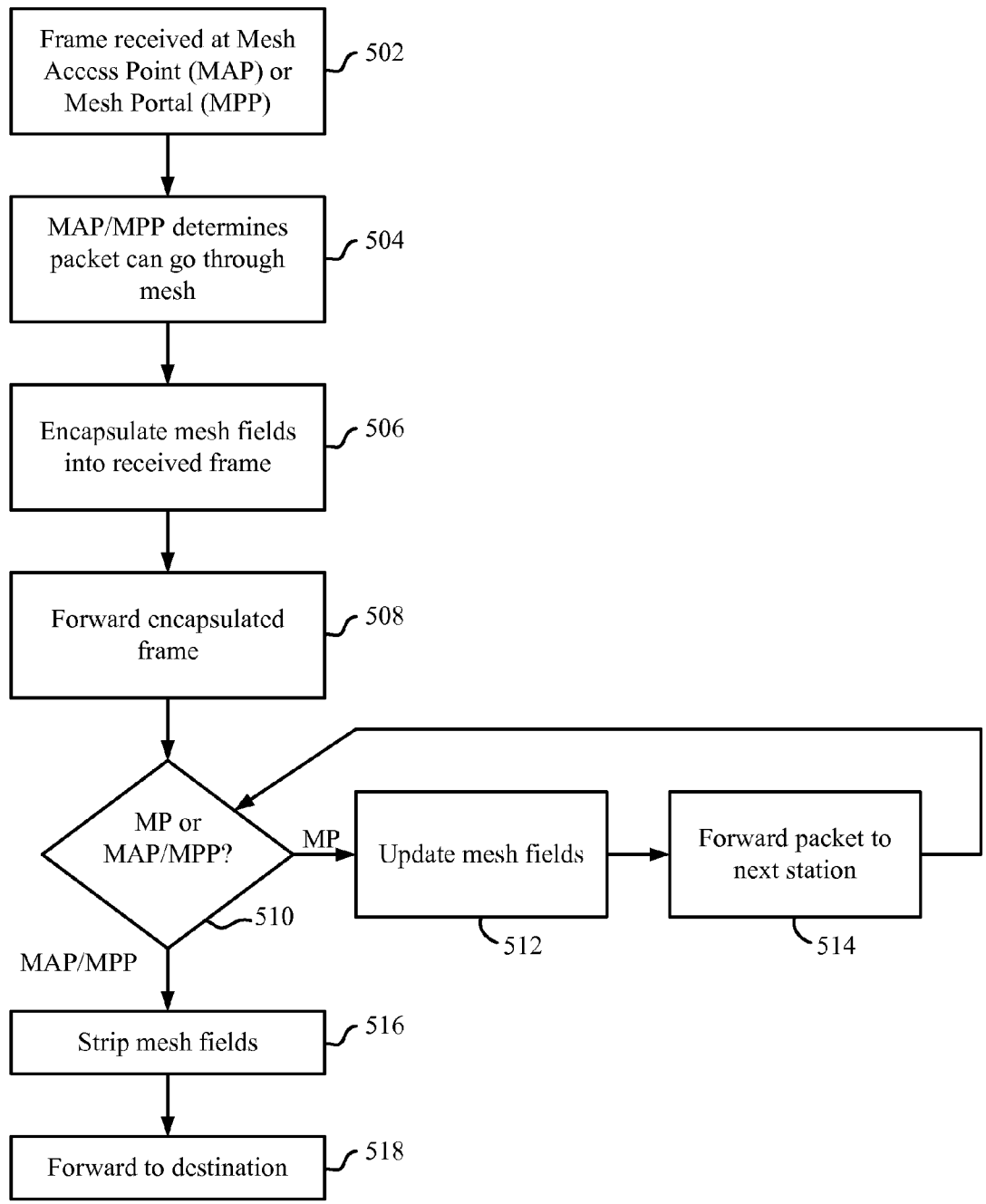
FIG. 5 is a flowchart depicting a method of adding mesh fields into a MAC frame and routing of such frames, in accordance with some aspects.

FIG. 5 is a flowchart depicting a method of inserting mesh headers, in accordance with various aspects. As depicted at 502, the process begins when a frame is received at a MAP or MPP from a connected non-mesh station en route to its non-mesh destination. Upon receipt of the packet, the MAP or MPP examines the frame and determines that it may be routed through the mesh network, as depicted at 504.

As depicted at 506, the MAP or MPP inserts a mesh header into the received frame before transmitting the frame to the next-hop station. For example, the MAP or MPP may set a type field, such as the ethertype field in the SNAP header, to indicate the presence of the mesh header. The MAP or MPP inserts the non-mesh source station address and the non-mesh destination station address into the address fields of the mesh header. The MAP or MPP prepares the packet to include six addresses, including the ultimate non-mesh source and ultimate non-mesh destination fields, which are included in the mesh header, and the immediate mesh receiver, immediate mesh transmitter, ultimate mesh source, and ultimate mesh destination fields, which are included in the MAC header. The original payload is added after the mesh header, starting with the original LLC header. The MAP or MPP then forwards the frame to the next-hop station (the mesh receiver), as depicted at 508.

As depicted at 510, the next-hop station may be an MP, an MAP, or an MPP. Both the MAP and the MPP provide access to non-mesh devices. If the next-hop device is an MP, then the MP updates the mesh fields, as depicted at 512. This includes updating a mesh time-to-live field to represent the current transmission. The frame is then forwarded to the next-hop device, as depicted at 514.

If, at 510, it is determined by a MAP or MPP that the next-hop station is the non-mesh destination device, the MAP or MPP strips the mesh header, as depicted at 516. The device may remove the LLC/SNAP identifiers indicating the presence of the mesh header, and re-format the MAC address fields such that the packet can be transmitted to the non-mesh destination, as depicted at 518.

Figure 6:
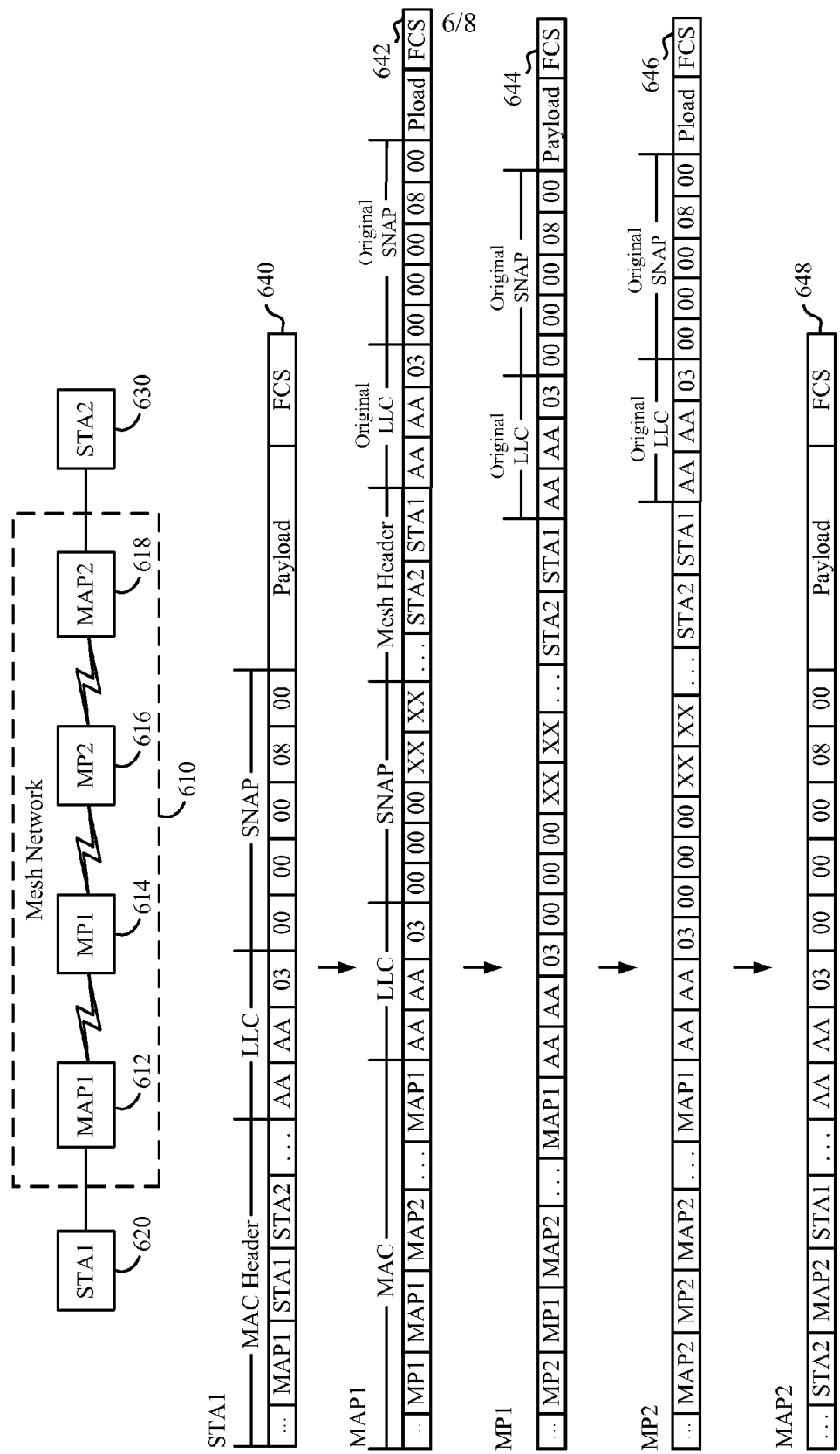
FIG. 6 depicts an example of a mesh network and the MPDUs routed through the exemplary network, in accordance with some aspects.

FIG. 6 is a simplified example of a process for inserting mesh headers, according to some disclosed aspects. A mesh network 610 comprises a first MAP 612, a first MP 614, a second MP 616, and a second MAP 618. The first MAP 612 provides connectivity to a first station 620, which is not a part of the mesh. Second MAP 618 provides connectivity to a second station 630, also outside of the mesh.

A frame or PDU being transmitted by the first station 620 is depicted at 640. As the station is a not a member of the mesh network, the frame may be a typical 802.11 data frame. The receiver address is indicated as MAP1 and the transmitter address is indicated as STA1. The destination address is indicated as STA2. The data frame may include an LLC frame that indicates the presence of a SNAP header. The SNAP header includes OUI 00-00-00 and ethertype 08-00, indicating that the payload data is an IP packet. It is noted that these OUI and ethertype values are merely exemplary. Other values may be used depending upon the type of protocol data unit.

When the frame is received by the first MAP 612, the MAP 612 may determine that the frame may be forwarded through the mesh. As such, first MAP 612 inserts a mesh header into the received frame, as depicted at 642. The ethertype field of the first SNAP header is set to indicate the presence of the mesh header. This is represented throughout FIG. 6 by the value "xx-xx". The first address field reflects that the immediate receiver is MP1, the immediate transmitter is MAP1, the mesh source is MAP1, and the mesh destination is MAP2. The mesh header, which is added by first MAP 712, indicates that the ultimate destination is STA2 and the ultimate source is STA1. The original LLC/SNAP header (AA-AA-03/00-00-00-08-00) is added after the mesh header followed by the original IP packet.

The address fields representing the ultimate non-mesh source STA1, ultimate non-mesh destination STA2, mesh source MAP1, and mesh destination MAP2 remain constant as the frames traverse mesh points. The original LLC/SNAP header also follows the mesh header in each of these frames. The frame as transmitted by the first MP 614, depicted at 644, indicates that the immediate receiver is MP2 and that the immediate transmitter is MP1, while the second MP 616 indicates, as depicted at 646, that the immediate receiver is MAP2 and the immediate transmitter is MP2.

The second MAP 618 is the exit point for the mesh. As such, upon receiving the frame, MAP 618 removes the extended mesh header that includes the fifth and sixth address fields and mesh specific LLC/SNAP header, and reformats the MAC address to indicate that the receiver is STA2, the transmitter is MAP2, and the source is STA1, as depicted at 648.

According to some aspects, the ethertype in the first SNAP field of the frame containing a mesh header may be equal to 89-0d. The 89-0d protocol is specified in Annex U of IEEE 802.11z draft 4.0. The mesh header may be preceded by a Protocol field in this case, as specified in Annex U of 802.11z draft 4.0. The Protocol field may contain a value that indicates the presence of a mesh header. The value that indicates the presence of a mesh header may be a new Protocol number that is assigned by the IEEE 802.11 Assigned Numbers Association (ANA). The mesh packet is said to be encapsulated as an Annex U frame in this case.

The above-described example represents an exemplary case where a frame originates outside of a mesh network and is transmitted to a destination outside the mesh network. However, the techniques described herein are equally applicable to a scenario wherein a transmission originates outside the mesh destined for a node within the mesh, or where a transmission originates inside the mesh destined for a node outside the mesh.

Figure 7:
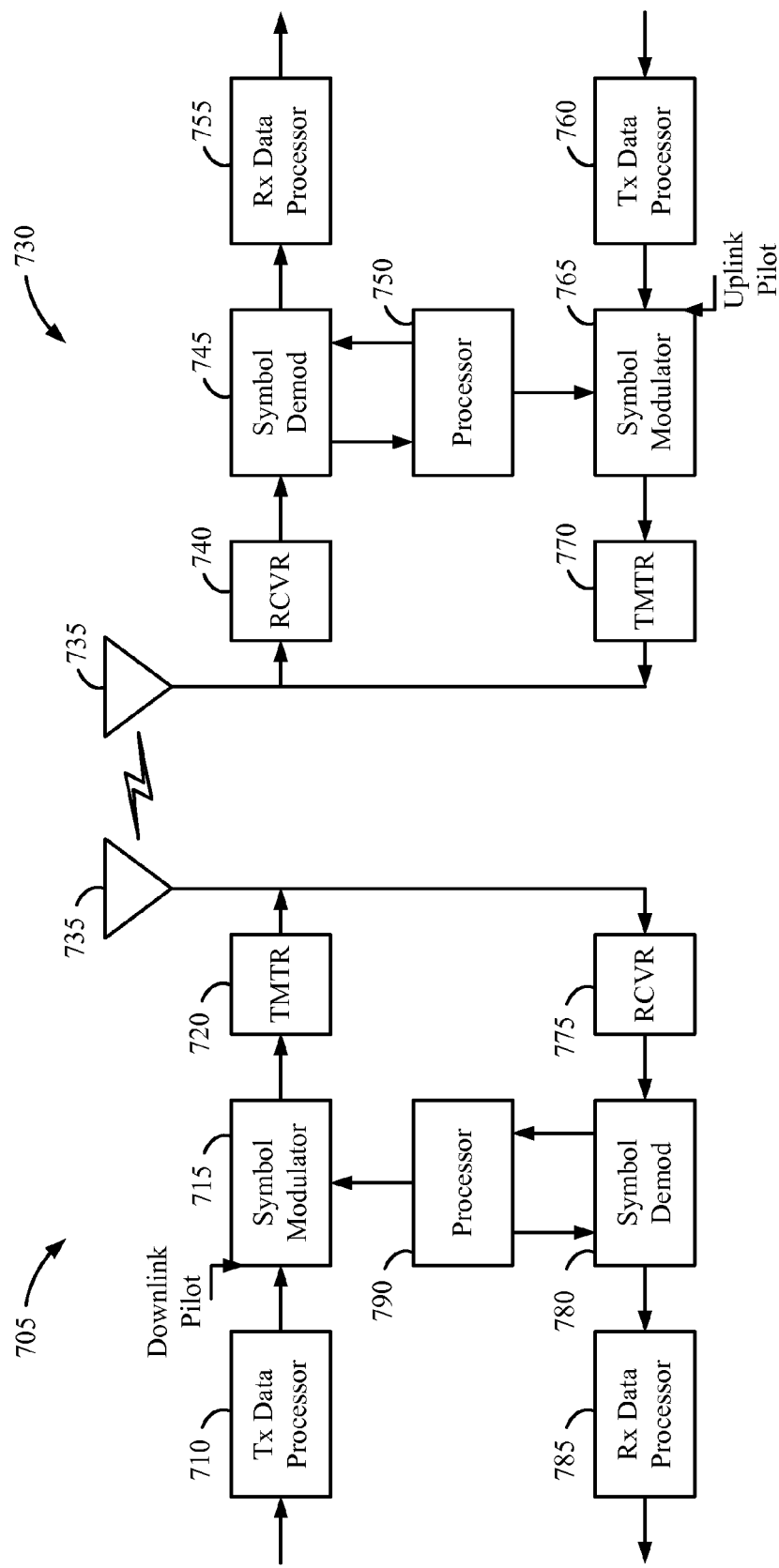
FIG. 7 depicts a wireless network environment that can be employed in conjunction with the various systems and methods described herein.

FIG. 7 depicts an exemplary wireless communication system 700. The wireless communication system 700 depicts one base station and one terminal for sake of brevity. However, it is to be appreciated that the system can include more than one base station and/or more than one terminal, wherein additional base stations and/or terminals can be substantially similar or different from the exemplary base station and terminal described below. In addition, it is to be appreciated that the base station and/or the terminal can employ the methods and/or systems described herein to facilitate wireless communication there between.

Referring now to FIG. 7, on a downlink, at access point 705, a transmit (TX) data processor 710 receives, formats, codes, interleaves, and modulates (or symbol maps) traffic data and provides modulation symbols ("data symbols"). A symbol modulator 715 receives and processes the data symbols and pilot symbols, and provides them to a transmitter unit (TMTR) 720. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), or code division multiplexed (CDM).

TMTR 720 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 725 to the terminals. At terminal 730, an antenna 730 receives the downlink signal and provides a received signal to a receiver unit (RCVR) 740. Receiver unit 740 conditions (e.g., filters, amplifies, and frequency downconverts) the received signal and digitizes the conditioned signal to obtain samples. A symbol demodulator 745 demodulates and provides received pilot symbols to a processor 750 for channel estimation. Symbol demodulator 745 further receives a frequency response estimate for the downlink from processor 750, performs data demodulation on the received data symbols to obtain data symbol estimates (which are estimates of the transmitted data symbols), and provides the data symbol estimates to an RX data processor 755, which demodulates (i.e., symbol demaps), deinterleaves, and decodes the data symbol estimates to recover the transmitted traffic data. The processing by symbol demodulator 745 and RX data processor 755 is complementary to the processing by symbol modulator 715 and TX data processor 710, respectively, at access point 705.

On the uplink, a TX data processor 760 processes traffic data and provides data symbols. A symbol modulator 765 receives and multiplexes the data symbols with pilot symbols, performs modulation, and provides a stream of symbols. A transmitter unit 770 then receives and processes the stream of symbols to generate an uplink signal, which is transmitted by the antenna 735 to the access point 705.

At access point 705, the uplink signal from terminal 730 is received by the antenna 725 and processed by a receiver unit 775 to obtain samples. A symbol demodulator 780 then processes the samples and provides received pilot symbols and data symbol estimates for the uplink. An RX data processor 785 processes the data symbol estimates to recover the traffic data transmitted by terminal 730. A processor 790 performs channel estimation for each active terminal transmitting on the uplink. Multiple terminals may transmit pilot concurrently on the uplink on their respective assigned sets of pilot subbands, where the pilot subband sets may be interlaced.

Processors 790 and 750 direct (e.g., control, coordinate, manage, etc.) operation at access point 705 and terminal 730, respectively. Respective processors 790 and 750 can be associated with memory units (not shown) that store program codes and data. Processors 790 and 750 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 790 and 750.

Figure 8:
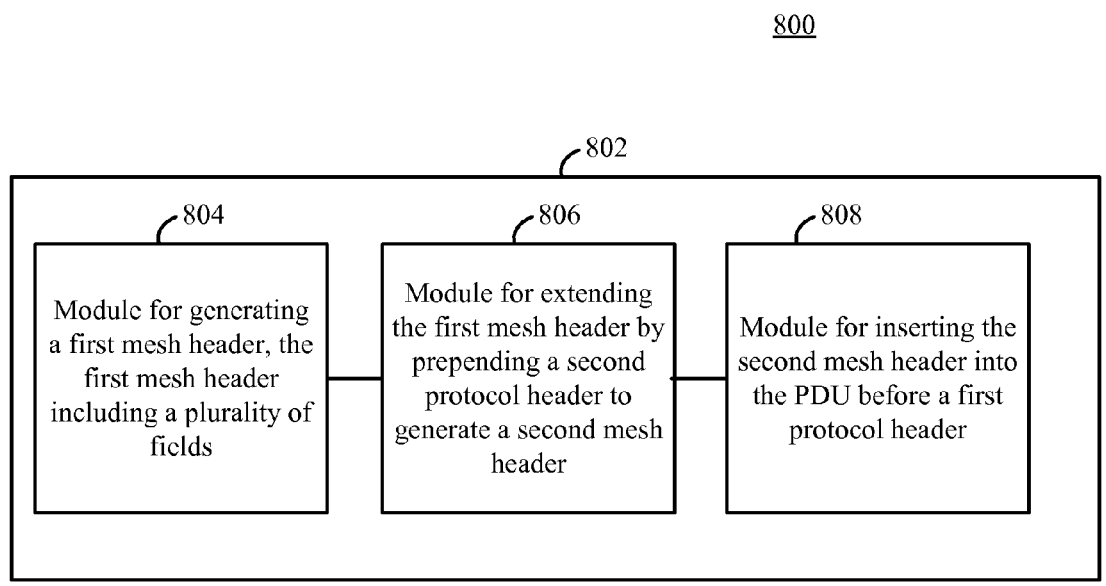
FIG. 8 is an illustration of an apparatus that facilitates performing a multi-hop wireless mesh network medium access control (MAC) protocol, in accordance with one or more aspects described herein.

With reference to FIG. 8, illustrated is a system 800 that receives and processes messages received over a wireless mesh network. For example, system 800 can reside at least partially within a receiver, transmitter, mobile device, etc. It is to be appreciated that system 800 is represented as including functional blocks, which can be functional blocks that represent the functions implemented by a processor, software, or a combination thereof (e.g., firmware). System 800 includes a logical grouping 802 of electrical components that can act in conjunction. For instance, logical grouping 802 can include a module for generating a first mesh header, the first mesh header including a plurality of fields 804. Logical grouping 802 can also comprise a module for extending the first mesh header by prepending a second protocol header to generate a second mesh header 806. Logical grouping 802 can further comprise a module for inserting the second mesh header into the PDU before a first protocol header.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for transmitting data over a wireless mesh network, comprising:
   generating a first mesh header, the first mesh header including a plurality of fields;
   generating a combination of a destination service access point (DSAP) field and a source service access point (SSAP) field to generate an indication that the first mesh header is present;
   determining whether a destination device is a mesh destination device;
   based upon a determination that the destination device is not a mesh destination device, stripping the first mesh header; and
   removing the indication that the first mesh header is present;
   based upon a determination that the destination device is a mesh destination device,
      extending the first mesh header by prepending a second protocol header to generate a second mesh header, the second protocol header having a same format as a first protocol header of a protocol data unit (PDU); and
      inserting the second mesh header into the PDU before the first protocol header, wherein the first protocol header has a different format than the second mesh header.

2. The method of claim 1, wherein extending the first mesh header to generate the second mesh header further comprises prepending one or more header fields to the first mesh header.

3. The method of claim 1, wherein the second protocol header indicates a presence of the first mesh header.

4. The method of claim 2, wherein at least one of the one or more header fields indicates a presence of the first mesh header.

5. The method of claim 2, wherein the second protocol header and the one or more header fields indicate a presence of the first mesh header.

6. The method of claim 1, wherein the first protocol header comprises an indication of a following protocol header.

7. The method of claim 1, wherein the first protocol header and the second protocol header comprise a logical link control (LLC) header.

8. The method of claim 2, wherein the first protocol header and the second protocol header comprise a logical link control (LLC) header, and the one or more header fields include a SubNetwork Address Protocol (SNAP) header.

9. The method of claim 2, wherein the first protocol header and the second protocol header comprise a logical link control (LLC) header, and the one or more header fields include a SubNetwork Address Protocol (SNAP) header and a Protocol field.

10. The method of claim 9, wherein the second protocol header indicates a presence of the SNAP header, the SNAP header indicates a presence of the Protocol field, and wherein the Protocol field indicates a presence of the first mesh header.

11. The method of claim 10, wherein the SNAP header includes an ethertype field having a pre-defined value.

12. The method of claim 1, wherein the PDU comprises a medium access control (MAC) PDU (MPDU) frame, and wherein inserting the second mesh header comprises: inserting an immediate receiver address, an immediate transmitter address, a mesh destination address, and a mesh source address into address fields of a MAC header forming part of the MPDU; and inserting an ultimate source address and an ultimate destination address into address fields of the first mesh header or the second mesh header.

13. The method of claim 12, further comprising:
upon receipt of the MPDU by a mesh destination, removing the second mesh header; and
re-formatting the MAC header to forward the frame to an ultimate destination.

14. The method of claim 1, wherein the PDU is selected from a group consisting of a medium access control (MAC) PDU (MPDU), a data link layer protocol, an application layer protocol, a presentation layer protocol, a session layer protocol, a transport layer protocol, a network layer protocol, and a physical layer protocol.

15. The method of claim 1, wherein the wireless mesh network comprises an 802.11 wireless mesh network.

16. The method of claim 1, wherein the first mesh header includes an ultimate source address associated with an ultimate source of the PDU and an ultimate destination address associated with an ultimate destination of the PDU; and
wherein either the ultimate source comprises a non-mesh station, the ultimate destination comprises a non-mesh station, or the ultimate source and the ultimate destination comprise non-mesh stations.

17. The method of claim 1, wherein a first mesh access point inserts the second mesh header.

18. The method of claim 1, wherein the PDU is encapsulated as an Annex U frame.

19. An apparatus operable in a wireless mesh network, the apparatus comprising:
a processor, configured to:
generate a first mesh header including a plurality of fields,
generate a combination of a destination service access point (DSAP) field and a source service access point (SSAP) field to generate an indication that the first mesh header is present,
determine whether a destination device is a mesh destination device,
based upon a determination that the destination device is not a mesh destination device,
strip the first mesh header, and
remove the indication that the first mesh header is present,
based upon a determination that the destination device is a mesh destination device,
extend the first mesh header by prepending a second protocol header having a same format as a first protocol header in a protocol data unit (PDU) to generate a second mesh header, and
insert the second mesh header into the PDU before the first protocol header, wherein the first protocol header has a different format than the second mesh header; and
a memory coupled to the processor for storing data.

20. The apparatus of claim 19, wherein the processor is further configured to extend the first mesh header to generate the second mesh header by prepending one or more header fields to the first mesh header.

21. The apparatus of claim 19, wherein the second protocol header indicates a presence of the first mesh header.

22. The apparatus of claim 20, wherein at least one of the one or more header fields indicates a presence of the first mesh header.

23. The apparatus of claim 22, wherein the second protocol header indicates a presence of at least one of the one or more header fields.

24. The apparatus of claim 20, wherein the second protocol header and at least one of the one or more header fields indicate a presence of the first mesh header.

25. The apparatus of claim 19, wherein the first protocol header comprises an indicator of a following protocol header.

26. The apparatus of claim 19, wherein the first protocol header and the second protocol header comprise a logical link control (LLC) header.

27. The apparatus of claim 20, wherein the first protocol header and the second protocol header comprise a logical link control (LLC) header, and the one or more header fields include a SubNetwork Address Protocol (SNAP) header.

28. The apparatus of claim 20, wherein the first protocol header and the second protocol header comprise a logical link control (LLC) header, and the one or more header fields include a SubNetwork Address Protocol (SNAP) header and a Protocol field.

29. The apparatus of claim 28, wherein the first protocol header indicates a presence of the SNAP header, the SNAP header indicates a presence of the Protocol field, and wherein the Protocol field indicates a presence of the first mesh header.

30. The apparatus of claim 28, wherein the SNAP header includes an ethertype field having a pre-defined value.

31. The apparatus of claim 20, wherein the PDU comprises a medium access control (MAC) PDU (MPDU) frame, and wherein after inserting the second mesh header, the MPDU includes an immediate receiver address, an immediate transmitter address, a mesh destination address, and a mesh source address in a MAC header forming part of the MPDU, and further comprising an ultimate source address and an ultimate destination address in the second mesh header.

32. The apparatus of claim 31, wherein the processor is further configured to remove the second mesh header and re-format the MAC header prior to forwarding the frame to the ultimate destination.

33. The apparatus of claim 19, wherein the PDU is selected from a group consisting of an MPDU, a data link layer protocol, an application layer protocol, a presentation layer protocol, a session layer protocol, a transport layer protocol, a network layer protocol, and a physical layer protocol.

34. The apparatus of claim 19, wherein the wireless mesh network comprises an 802.11 wireless mesh network.

35. The apparatus of claim 19, wherein the first mesh header includes an ultimate source address associated with an ultimate source of the PDU and an ultimate destination address associated with an ultimate destination of the PDU; and
   wherein either the ultimate source comprises a non-mesh station, the ultimate destination comprises a non-mesh station, or the ultimate source and the ultimate destination comprise non-mesh stations.

36. The apparatus of claim 19, wherein the PDU is encapsulated as an Annex U frame.

37. A non-transitory machine-readable storage medium having instructions which, when executed by a machine, cause the machine to perform operations including operations to:
   generate a first mesh header, the first mesh header including a plurality of fields;
   generate a combination of a destination service access point (DSAP) field and a source service access point (SSAP) field to generate an indication that the first mesh header is present;
   determine whether a destination device is a mesh destination device;
   based upon a determination that the destination device is not a mesh destination device,
      strip the first mesh header; and
      remove the indication that the first mesh header is present;
   based upon a determination that the destination device is a mesh destination device,
      extend the first mesh header by prepending a second protocol header to generate a second mesh header, the second protocol header having a same format as a first protocol header of a protocol data unit (PDU); and
      insert the second mesh header into the PDU before the first protocol header, wherein the first protocol header has a different format than the second mesh header.

38. An apparatus operable in a wireless mesh network, the apparatus comprising:
   means for generating a first mesh header, the first mesh header including a plurality of fields;
   means for generating a combination of a destination service access point (DSAP) field and a source service access point (SSAP) field to generate an indication that the first mesh header is present;
   means for determining whether a destination device is a mesh destination device;
   based upon a determination that the destination device is not a mesh destination device,
      means for stripping the first mesh header; and
      means for removing the indication that the first mesh header is present;
   based upon a determination that the destination device is a mesh destination device,
      means for extending the first mesh header by prepending a second protocol header to generate a second mesh header, the second protocol header having a same format as a first protocol header of a protocol data unit (PDU); and
      means for inserting the second mesh header into the PDU before the first protocol header, wherein the first protocol header has a different format than the second mesh header.

* * * * *